United States Patent
Kobayashi

(10) Patent No.: US 7,949,253 B2
(45) Date of Patent: May 24, 2011

(54) FILTER FRAME AND CAMERA FILTER UNIT

(76) Inventor: Hideo Kobayashi, Azumino (JP)

( * ) Notice: Subject to any disclaimer, the term of this patent is extended or adjusted under 35 U.S.C. 154(b) by 0 days.

(21) Appl. No.: 12/579,628

(22) Filed: Oct. 15, 2009

(65) Prior Publication Data
US 2010/0111519 A1 May 6, 2010

(30) Foreign Application Priority Data
Nov. 4, 2008 (JP) ................. 2008-283467

(51) Int. Cl.
*G03B 11/00* (2006.01)
*H04N 5/225* (2006.01)
(52) U.S. Cl. .................. 396/544; 348/375; 359/723
(58) Field of Classification Search .................. 396/544; 348/375; 359/723
See application file for complete search history.

(56) References Cited

FOREIGN PATENT DOCUMENTS
JP 11-271840 A 10/1999

*Primary Examiner* — Rochelle-Ann J Blackman
(74) *Attorney, Agent, or Firm* — Buchanan Ingersoll & Rooney PC

(57) ABSTRACT

In a camera filter unit having a small longitudinal width, the camera filter unit (1) comprises a filter frame (2) having a cylindrical component (2*a*) and a filter-holding ring (3), and an optical filter (4). The optical filter (4) is fixed to an internal side of the filter-holding ring (3) in a state of being held from the front and the rear between a protuberance (31) formed in the filter-holding ring (3) and a crimp (33*a*). The filter-holding ring (3) is fixed to the internal side of the cylindrical component (2*a*) by a ring-side male thread (32) being screwed into a female thread (22) of the filter frame (2). The filter-holding ring (3) for holding the optical filter (4) is disposed concentrically between the cylindrical component (2*a*) and the optical filter (4), and the longitudinal dimension of the filter frame (2) can therefore be made smaller than when the member for holding the optical filter is mounted to the cylindrical component (2*a*) in a state of being aligned with the optical filter (4) in the axial direction.

13 Claims, 5 Drawing Sheets

(PRIOR ART)

FILTER FRAME AND CAMERA FILTER UNIT

BACKGROUND OF THE INVENTION

1. Field of the Invention

The present invention relates to a camera filter unit, and particularly to a technique for improving a filter frame for holding an optical filter.

2. Description of the Related Art

The configuration shown in FIG. 5 is a known example of a camera filter unit mounted to a lens tube of a taking lens of a camera. This type of a camera filter unit is disclosed in JP-A 11-271840.

A camera filter unit 100 comprises a discoid optical filter 103, and a cylindrical filter frame 101 which holds the optical filter 103 on the internal side, as shown in FIG. 5. A male thread 101b is formed in the external peripheral surface of the filter frame 101 in an area of a specified width forward from the rear end edge. A female thread 101a is formed in the internal peripheral surface of the filter frame 101 in an area of a specified width rearward from the front end edge.

The male thread 101b in the external peripheral surface is used in order to mount the camera filter unit 100 to a lens tube 106, and the female thread 101a in the internal peripheral surface is used in order to mount a lens cap to the camera filter unit 100 or to join another camera filter unit to the front side. The optical filter 103 is fixed to a filter holder 102 formed in the internal peripheral surface of the filter frame 101.

To describe in greater detail, the filter holder 102 is formed to the rear of the female thread 101a in the internal peripheral surface of the filter frame 101, and the filter holder comprises a circular internal peripheral surface 102a of a specified width and an annular protuberance 102b which protrudes inward from the rear end edge of the circular internal peripheral surface 102a. The optical filter 103 is inserted into the filter holder 102 from the front side of the filter frame 101, an external peripheral surface portion 103a of the optical filter 103 is in contact with the circular internal peripheral surface 102a, and a rear end edge potion 103b of the optical filter 103 is in contact with the front end surface of the protuberance 102b.

The optical filter 103 is pushed from the front against the protuberance 102b by an annular retaining ring 104, and is positioned in the direction of an axis line 100a. The retaining ring 104 has formed in the external peripheral surface a male thread 104a capable of threading with the female thread 101a, and the retaining ring 104 is threaded up to the end at the rear of the female thread 101a. A rear end surface 104b of the retaining ring 104 is in contact with a front end edge 103c of the optical filter 103.

The camera filter unit is usually mounted to the front end portion of the lens tube of the taking lens. Therefore, when the filter frame holding the optical filter is long in terms of its longitudinal dimension, there is a problem in that the front end portion of the filter frame gets in the angle of field of the taking lens. Therefore, a demand exists for a reduced dimension of the filter frame in a camera filter unit.

In a conventional camera filter unit 100, a dimension L of the filter frame 101 is a combination of the thickness dimension M of the optical filter 103, the width dimension N of the retaining ring 104 in the longitudinal direction, a first dimension O from the retaining ring 104 to the front end of the filter frame 101, and a second dimension P from the rear surface of the optical filter 103 to the rear end of the filter frame 101.

The first dimension O cannot be reduced because the area of a specified width from the front end edge of the filter frame 101 is a mounting area for mounting the lens cap or another component. The second dimension P cannot be reduced because a predetermined dimension must be ensured so that when the camera filter unit 100 is mounted to the lens tube 106 of the taking lens 105 of the camera, the front end surface 105a of the foremost lens constituting the taking lens 105 and the rear surface of the optical filter 103 do not interfere with each other. There is also a limit to reducing the width dimension N of the retaining ring 104 because in order to reliably fix the optical filter 103 to the filter frame 101, a width dimension must be ensured in the area over which the male thread 104a is formed in the external peripheral surface of the retaining ring 104. Furthermore, the dimension M is determined by the thickness dimension of the optical filter 103 being held. Therefore, there is a problem in that it is difficult to reduce the width L of the conventional filter frame 101 (to reduce the dimension L in the direction of the center axis line).

SUMMARY OF THE INVENTION

An object of the present invention is to provide a filter frame of small width by improving the structure for mounting an optical filter to a filter frame, and also a camera filter unit of small width comprising this filter frame.

In order to resolve the aforesaid problems, according to the present invention, there is provided a filter frame of a camera filter unit, which comprises:

a cylindrical component;

a cylindrical filter-holding ring for holding an optical filter on the internal side, the filter-holding ring being concentrically fixed to the internal side of the cylindrical component; and a front stopper and a rear stopper for holding the optical filter therebetween from the front and the rear, the optical filter being held on the internal side of the filter-holding ring; wherein the front stopper is formed in the front end edge of the filter-holding ring;

the rear stopper is formed either in the rear end edge of the filter-holding ring or the internal peripheral surface of the cylindrical component; and the filter-holding ring is fixed in the internal side of the cylindrical component in a state of not protruding from the front or the rear of the cylindrical component.

In the filter frame of the present invention, the filter-holding ring is concentrically fixed to the internal side of the cylindrical component, and the optical filter is concentrically held in the internal side of the filter-holding ring. In other words, the filter-holding ring, which is a member for mounting the optical filter to the filter frame, is not disposed in front of or behind the optical filter, but is concentrically disposed in the internal side of a cylindrical part (the external peripheral side of the optical filter). As a result, the width dimension (the longitudinal dimension) of the filter frame can be made smaller than when a retaining ring or another mounting tool is used in order to hold the optical filter.

Since there is no need to dispose a mounting tool for mounting the optical filter to the filter frame in front or behind the optical filter, the mounting tool does not interfere with the surface (light-incident surface, light-emitting surface) of the optical filter.

Furthermore, in the present invention, the optical filter can be held reliably because a sufficient mounting area can be ensured for the filter-holding ring within the width dimension of the external peripheral surface of the optical filter.

According to the present invention, it is preferable that a frame-side male thread be formed in the external peripheral surface of the cylindrical component in an area of a specified width forward from the rear end edge, a female thread be formed in the internal peripheral surface of the cylindrical component in an area of a specified width rearward from the front end edge, a ring-side male thread capable of fitting into the female thread be formed rearward from the front end edge in the external peripheral surface of the filter-holding ring in an area of less width than the area over which the female thread is formed, and the ring-side male thread of the filter-holding ring be screwed up to the rear end of the female thread, with the front portion of the female thread being exposed in the front side of the filter-holding ring.

A female thread for joining the lens cap, the camera filter unit, and other components is typically formed in the internal peripheral surface of the front end of the filter frame. The filter-holding ring can be fixed to the cylindrical component by forming a male thread in the external peripheral surface of the filter frame holding ring, the male thread being capable of threading with the female thread.

The front stopper can be a protuberance which protrudes inward from the front end edge of the filter-holding ring, and the rear stopper can be an annular crimp formed by inwardly crimping the rear end edge portion in the filter-holding ring. The optical filter can thus be mounted to the filter frame in a state of being fixed to the filter-holding ring, and the operation of fixing the optical filter to the filter frame is therefore made easier. The number of components can also remain low because there is no need to prepare any members other than the filter-holding ring in order to fix the optical filter to the filter-holding ring.

In this case, the cylindrical component preferably has in the rear side of the crimp an annular part having an annular end surface protruding farther inward than the crimp. The crimp can thus be covered by the annular part, and the aesthetic appearance of the camera filter unit is therefore improved. In this case, the frame-side male thread is also preferably formed in the external peripheral surface of the annular part.

Next, in cases in which the cylindrical component has in the rear end portion a small-diameter annular part disposed coaxially, the rear stopper can be an annular end surface formed between the internal peripheral surface of the cylindrical component and the internal peripheral surface of the annular part. The optical filter is thus fixed by being held between the front stopper of the filter-holding ring and the annular end surface of the annular part of the cylindrical component, and there is therefore no need to fix the optical filter to the filter-holding ring. Therefore, the optical filter can be fixed to the filter frame merely be threading the filter-holding ring holding the optical filter into the cylindrical component. The number of components can also remain few because there is no need to prepare any members other than the filter-holding ring in order to fix the optical filter to the filter frame.

Next, the front end surface of the protuberance is preferable a diffuse reflection surface. External light that would permeate into the filter frame from the external periphery at the front end of the filter frame is thus diffusely reflected by the front end surface of the protuberance of the filter-holding ring. Therefore, in cases in which the camera filter unit is mounted to the distal end portion of the taking lens of the camera, it is possible to reduce the occurrence of instances in which external light is reflected into the screen of the camera.

The camera filter unit of the present invention is characterized in having the filter frame of the configuration described above, and an optical filter held coaxially in the internal side of the filter-holding ring of the filter frame in a state of being held between the front stopper and the rear stopper. According to the present invention, a camera filter unit of small width can be obtained by using a filter frame of small width.

DESCRIPTION OF THE PREFERRED EMBODIMENTS

Embodiments of a camera filter unit obtained by applying the present invention will now be described with reference to the drawings.

Embodiment 1

Figure 1:
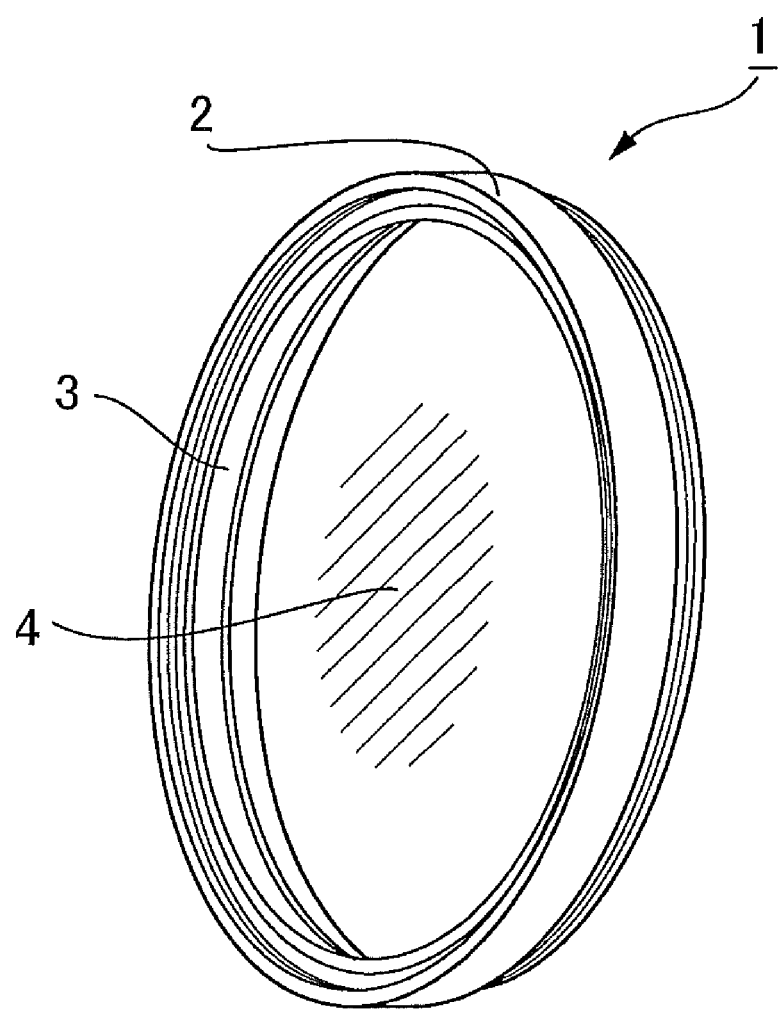
FIG. 1 is a perspective view of a camera filter unit according to Embodiment 1 of the present invention.
Figure 2:
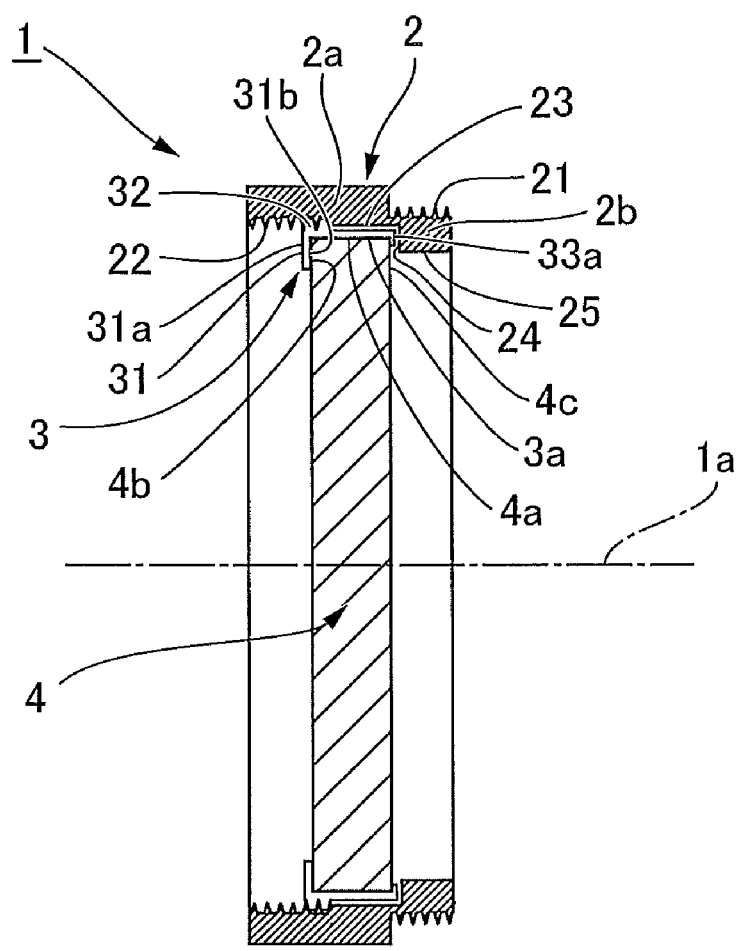
FIG. 2 is a longitudinal cross-sectional view of the camera filter unit of FIG. 1.

FIG. 1 is a perspective view of a camera filter unit according to Embodiment 1, and FIG. 2 is a schematic longitudinal cross-sectional view thereof. The camera filter unit 1 has a filter frame 2, and a discoid optical filter 4 held concentrically on the internal side of the filter frame 2, as shown in the drawings. The filter frame 2 has a cylindrical component 2*a*, and a filter-holding ring 3 concentrically and threadably fixed into the internal side of the cylindrical component 2*a*. The width of the cylindrical component 2*a* (the dimension in the direction of a center axis 1*a* of the filter frame) is significantly greater than the widths of the filter-holding ring 3 and the optical filter 4.

A small-diameter annular part 2*b* is coaxially and integrally formed in the rear end portion of the cylindrical component 2*a*, as can be seen from FIG. 2. A frame-side male thread 21 is formed in the small-diameter external peripheral surface of the annular part 2*b*. The frame-side male thread 21 is used in order to mount the camera filter unit 1 to a lens tube (not shown) of a taking lens.

In the internal peripheral surface of the cylindrical component 2*a* of the filter frame 2, a female thread 22 is formed in the front half portion thereof. The female thread 22 is used for mounting a lens cap, linking to the camera filter unit, and for other purposes. The width of the female thread 22 is formed so as to be greater than the mounting area required to mount the lens cap, the camera filter unit, and other components. The rear side of the female thread 22 is a circular internal peripheral surface portion 23, to the rear end of which is joined an inward-protruding annular end surface 24 of the annular part 2*b*, and a small-diameter circular internal peripheral surface 25 of the annular part 2*b* is joined to the internal peripheral edge ends of the end surface 24.

The filter-holding ring 3 mounted to the internal side of the cylindrical component 2*a* of the filter frame 2 comprises on its front end edge an annular protuberance (front stopper) 31 protruding inward. The front end surface of the protuberance 31 is a diffuse reflection surface 31*a* in which a plurality of grooves are formed concentrically. In the external peripheral surface of the filter-holding ring 3, a ring-side male thread 32 capable of being threaded into the female thread 22 of the filter frame 2 is formed only in the front end edge portion. Therefore, the width over which the ring-side male thread 32 is formed is significantly smaller than the width over which the female thread 22 is formed in the filter frame 2.

Figure 3:
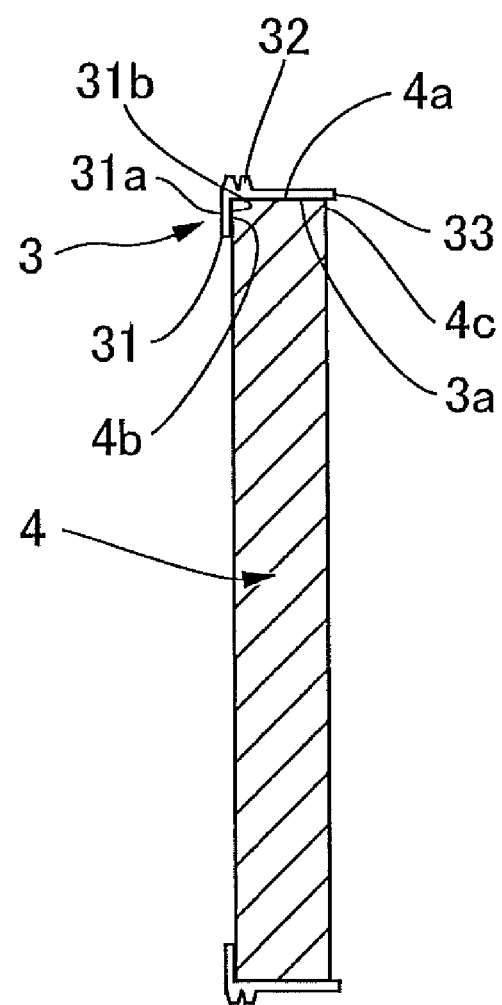
FIG. 3 is a longitudinal cross-sectional view showing only the filter-holding ring, which holds the optical filter, as having been removed from the camera filter unit of FIG. 1.

FIG. 3 is a schematic longitudinal cross-sectional view showing the filter-holding ring 3, which holds the optical filter 4. The optical filter 4 is inserted into the internal side of the filter-holding ring 3 from the rear, as can be seen in the drawing. A circular external peripheral surface 4a of the optical filter 4 is in contact with the circular internal peripheral surface 3a of the filter-holding ring 3, and a front end edge portion 4b of the optical filter 4 is in contact with an annular rear end surface 31b of the protuberance 31 of the filter-holding ring 3.

The filter-holding ring 3 is slightly wider than the optical filter 4, and the filter-holding ring 3 comprises an annular rear end edge portion 33 which protrudes slightly farther rearward than a rear end edge 4c when the optical filter 4 has been mounted. The rear end edge portion 33 is crimped to the internal side while the optical filter 4 is held in the filter-holding ring 3, as shown in FIG. 2. The optical filter 4 is held between an annular crimp (rear stopper) 33a formed by crimping and the protuberance 31 of the filter-holding ring 3, and is held in the filter-holding ring 3 so as to not move in the longitudinal direction (the direction of the center axis 1a).

The filter-holding ring 3 which holds the optical filter 4 as shown in FIG. 2 is threadably fixed to the cylindrical component 2a from the front. Specifically, the filter-holding ring 3 is threadably fixed to the internal side of the cylindrical component 2a by threading the ring-side male thread 32 of the filter-holding ring 3 up to the rear end of the female thread 22 of the cylindrical component 2a.

In a state in which the filter-holding ring 3 has been threadably fixed to the cylindrical component 2a, the portion of the female thread 22 at the front of the filter-holding ring 3 is exposed. This portion is a mounting area for threadably fixing the lens cap, the camera filter unit, and other components.

In a state in which the filter-holding ring 3 is fixed to the cylindrical component 2a, the crimp 33a at the rear of the filter-holding ring 3 is hidden by the annular part 2b in the rear end portion of the cylindrical component 2a. Specifically, the inside diameter of the annular part 2b is smaller than the diameter of the crimp 33a, and the crimp 33a is completely covered. Consequently, the crimp 33a cannot be seen from the external side of the camera filter unit 1, and the aesthetic appearance of the camera filter unit 1 is improved.

Furthermore, in a state in which the filter-holding ring 3 is fixed to the cylindrical component 2a, the diffuse reflection surface 31a of the annular protuberance 31 at the front of the filter-holding ring 3 diffusely reflects external light that would permeate into the cylindrical component from the external periphery at the front end of the cylindrical component 2a. Therefore, when the camera filter unit 1 has been mounted to the distal end portion of the taking lens of the camera, it is possible to prevent or inhibit external light from being reflected into the screen of the camera.

The circular internal peripheral surface portion 23 is formed between the female thread 22 and the annular end surface 24 of the annular part 2b in the internal peripheral surface of the cylindrical component 2a of the filter frame 2, and the filter-holding ring 3 held in the internal side of the circular internal peripheral surface portion 23 is a thin ring. Therefore, if the inside diameter of the cylindrical internal peripheral surface portion 23 of the filter frame 2 is slightly increased in proportion to the thickness of the filter-holding ring 3, an optical filter 4 of the same diameter as in conventional practice can be mounted.

Embodiment 2

Figure 4:
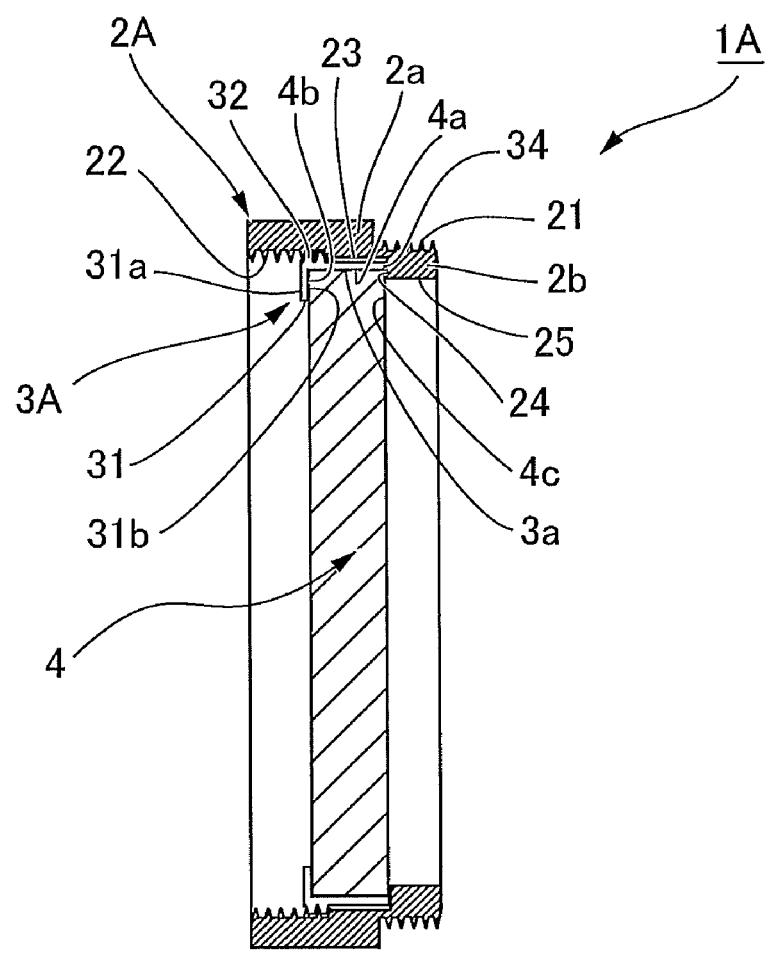
FIG. 4 is a longitudinal cross-sectional view of a camera filter unit according to Embodiment 2 of the present invention.
Figure 5:
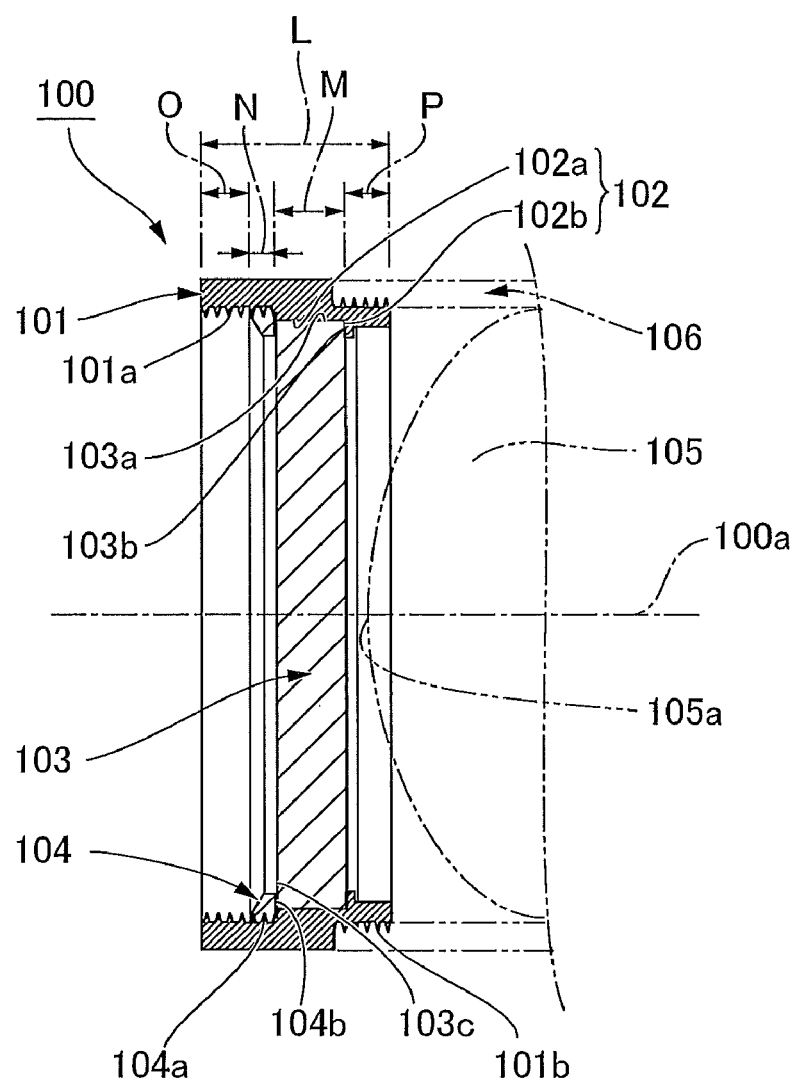
FIG. 5 is a longitudinal cross-sectional view of a conventional camera filter unit.

FIG. 4 shows a modification of the filter frame 2 according to Embodiment 1, and the mounting structure of the optical filter 4 in relation to the filter frame 2 is slightly different from Embodiment 1. Therefore, corresponding components are denoted by the same numerical symbols in FIG. 4, and the corresponding components are not described hereinbelow.

In the filter frame 2A of the camera filter unit 1A, the filter-holding ring 3A does not have a rear end edge portion 33 protruding farther rearward than the rear end edge 4c of the optical filter 4. Either the rear end 34 of the filter-holding ring 3A is positioned in the same position as the rear end edge 4c of the optical filter 4, or the rear end 34 of the filter-holding ring 3A is positioned in front of the rear end edge 4c of the optical filter 4.

In the present example, the annular end surface 24 in the annular part 2b at the rear of the cylindrical component 2a of the filter frame 2 functions as a rear stopper of the optical filter 4 held in the filter-holding ring 3A. Specifically, in a state in which the filter-holding ring 3A holding the optical filter 4 has been fixed to the cylindrical component 2a, the rear end surface 31b of the protuberance 31 of the filter-holding ring 3A is in contact with the front end edge portion 4b of the optical filter 4 from the front, and the annular end surface 24 of the annular part 2b at the rear end of the cylindrical component 2a is in contact with the rear end edge portion 4c of the optical filter 4 from the rear. The optical filter 4 is thereby held in the internal side of the filter frame 2 so as to not move in the longitudinal direction (in the direction of the center axis 1a).

According to the present example, the optical filter 4 is held so as not to move in the longitudinal direction merely by threading the filter-holding ring 3A, which holds the optical filter 4 on the internal side, into the cylindrical component 2a from the front. Consequently, the operation of assembling the camera filter unit 1A is simplified, and the longitudinal dimension of the filter frame 2 can be reduced.

Other Embodiments

In the example described above, a female thread of the cylindrical component and a ring-side male thread of the filter-holding ring are used in order to fix the filter-holding ring holding the optical filter to the internal side of the cylindrical component, but the filter-holding ring can also be fixed using an adhesive to the internal peripheral surface of the cylindrical component without forming a ring-side male thread in the external peripheral surface of the filter-holding ring.

In this case, it is preferable that, e.g., the area over which the female thread 22 of the cylindrical component 2a is formed be only the width needed for the mounting area of the lens cap or another component, the filter-holding ring 3 be inserted into the remaining internal peripheral surface portion, and the internal peripheral surface portion and the external peripheral surface of the filter-holding ring 3 be adhesively fixed together.

Nevertheless, since the cylindrical component 2a, the filter-holding ring 3, and the optical filter 4 are disposed concentrically, the longitudinal dimension of the filter frame 2 can be reduced. The bonded surface is the external peripheral surface on the opposite side of the internal side where the optical filter 4 is held, the filter-holding ring 3 being sandwiched in between. Therefore, when the optical filter 4 is fixed using an adhesive to the cylindrical component 2a, it is possible to avoid instances in which the adhesive reaches the internal side of the filter-holding ring 3 and adheres to the optical filter 4.

What is claimed is:

1. A filter frame of a camera filter unit, comprising:
   a cylindrical component;
   a cylindrical filter-holding ring for holding an optical filter on an internal side thereof, the filter-holding ring being concentrically fixed to an internal side of the cylindrical component; and
   a front stopper and a rear stopper for holding the optical filter therebetween from a front and a rear, the optical filter being held on the internal side of the filter-holding ring; wherein
   the front stopper is formed in a front end edge of the filter-holding ring;
   the rear stopper is formed either in a rear end edge of the filter-holding ring or an internal peripheral surface of the cylindrical component; and
   the filter-holding ring is fixed in the internal side of the cylindrical component in a state of not protruding from a front or a rear of the cylindrical component.

2. The filter frame of a camera filter unit according to claim 1, wherein
   a frame-side male thread is formed in an external peripheral surface of the cylindrical component in an area of a specified width forward from a rear end edge thereof;
   a female thread is formed in the internal peripheral surface of the cylindrical component in an area of a specified width rearward from a front end edge thereof;
   a ring-side male thread capable of fitting into the female thread is formed in an external peripheral surface of the filter-holding ring in a portion of a front end edge thereof; and
   the ring-side male thread of the filter-holding ring is screwed up to a rear end of the female thread, with a front portion of the female thread being exposed in a front side of the filter-holding ring.

3. The filter frame of a camera filter unit according to claim 2, wherein
   the front stopper is a protuberance which protrudes inward from a front end edge of the filter-holding ring; and
   the rear stopper is an annular crimp formed by inwardly crimping a rear end edge portion in the filter-holding ring.

4. The filter frame of a camera filter unit according to claim 3, wherein
   the cylindrical component has in a rear side of the crimp an annular part having an annular end surface protruding farther inward than the crimp; and
   the frame-side male thread is formed in the external peripheral surface of the annular part.

5. The filter frame of a camera filter unit according to claim 2, wherein
   the cylindrical component has a small-diameter annular part formed coaxially in a rear end portion thereof;
   the front stopper is a protuberance which protrudes inward from the front end edge of the filter-holding ring;
   the rear stopper is an annular end surface formed between the internal peripheral surface of the cylindrical component and an internal peripheral surface of the annular part; and
   the frame-side male thread is formed in an external peripheral surface of the annular part.

6. The filter frame of a camera filter unit according to claim 3, wherein a front end surface of the protuberance of the filter-holding ring is a diffuse reflection surface.

7. A camera filter unit comprising:
   the filter frame according to claim 1; and
   an optical filter held coaxially in the internal side of the filter-holding ring of the filter frame in a state of being held between the front stopper and the rear stopper.

8. The camera filter unit according to claim 7, wherein a front end surface of the protuberance of the filter-holding ring is a diffuse reflection surface.

9. The filter frame of a camera filter unit according to claim 5, wherein a front end surface of the protuberance of the filter-holding ring is a diffuse reflection surface.

10. A camera filter unit comprising:
    the filter frame according to claim 2; and
    an optical filter held coaxially in the internal side of the filter-holding ring of the filter frame in a state of being held between the front stopper and the rear stopper.

11. A camera filter unit comprising:
    the filter frame according to claim 3; and
    an optical filter held coaxially in the internal side of the filter-holding ring of the filter frame in a state of being held between the front stopper and the rear stopper.

12. A camera filter unit comprising:
    the filter frame according to claim 4; and
    an optical filter held coaxially in the internal side of the filter-holding ring of the filter frame in a state of being held between the front stopper and the rear stopper.

13. A camera filter unit comprising:
    the filter frame according to claim 5; and
    an optical filter held coaxially in the internal side of the filter-holding ring of the filter frame in a state of being held between the front stopper and the rear stopper.

* * * * *